United States Patent
Kikuchi

(10) Patent No.: US 10,244,088 B2
(45) Date of Patent: Mar. 26, 2019

(54) ELECTRONIC DEVICE, CONTROL METHOD OF ELECTRONIC DEVICE, AND PROGRAM

(71) Applicant: Sharp Kabushiki Kaisha, Sakai, Osaka (JP)

(72) Inventor: Masayuki Kikuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/063,296

(22) PCT Filed: Oct. 11, 2016

(86) PCT No.: PCT/JP2016/080143
§ 371 (c)(1),
(2) Date: Jun. 18, 2018

(87) PCT Pub. No.: WO2018/069977
PCT Pub. Date: Apr. 19, 2018

(65) Prior Publication Data
US 2018/0375975 A1 Dec. 27, 2018

(51) Int. Cl.
*H04M 1/02* (2006.01)
*G06F 3/041* (2006.01)
(Continued)

(52) U.S. Cl.
CPC ...... *H04M 1/0214* (2013.01); *G06F 3/04886* (2013.01); *G09G 3/3208* (2013.01); *H04M 1/0245* (2013.01); *G09G 2380/02* (2013.01)

(58) Field of Classification Search
CPC .... H04M 1/02; H04M 1/0214; H04M 1/0245; G06F 3/041; G06F 3/04886; G09G 3/3208; G09G 2380/02
(Continued)

(56) References Cited

U.S. PATENT DOCUMENTS 4,917,465 A * 4/1990 Conner ............... G02F 1/13473
349/112
5,175,672 A * 12/1992 Conner ............... G06F 1/1616
235/145 R
(Continued)

FOREIGN PATENT DOCUMENTS

JP 10-326124 A 12/1998
JP 2014-68288 A 4/2014
(Continued)

OTHER PUBLICATIONS

Official Communication issued in International Patent Application No. PCT/JP2016/080143, dated Dec. 20, 2016.

*Primary Examiner* — Hai V Nguyen
(74) *Attorney, Agent, or Firm* — Keating & Bennett, LLP

(57) ABSTRACT

An OLED panel is provided such that a rear face thereof faces upper faces of first to third housings. The first to third housings are disposed side-by-side in a first direction, exposing a display face in its entirety, in a case that a first hinge and a second hinge are set to open states. The third housing is larger in size in the first direction than the first housing and the second housing. The display face is partially exposed in a case that the first hinge and the second hinge are set to a closed state and an open state, respectively.

20 Claims, 17 Drawing Sheets

(51) Int. Cl.
*G09G 3/3208* (2016.01)
*G06F 3/0488* (2013.01)

(58) Field of Classification Search
USPC .................................................... 455/575.3
See application file for complete search history.

(56) References Cited

U.S. PATENT DOCUMENTS

| | | | | |
|---|---|---|---|---|
| 6,034,866 | A * | 3/2000 | Nobuchi | G06F 1/1626 |
| | | | | 248/298.1 |
| 7,164,576 | B2 * | 1/2007 | Suprapmo | G06F 1/1605 |
| | | | | 248/918 |
| 7,289,083 | B1 * | 10/2007 | Canova, Jr. | G06F 1/1622 |
| | | | | 345/1.1 |
| 8,560,003 | B2 * | 10/2013 | Kwak | G06F 1/1622 |
| | | | | 361/679.39 |
| 8,624,882 | B2 * | 1/2014 | Cok | G09G 3/2085 |
| | | | | 315/169.3 |
| 9,651,998 | B2 * | 5/2017 | Matsueda | G06F 1/1652 |
| 9,698,204 | B2 * | 7/2017 | Kamura | H01L 51/0096 |
| 9,760,122 | B1 * | 9/2017 | Aurongzeb | G06F 1/1637 |
| 9,761,182 | B2 * | 9/2017 | Lee | G09G 3/36 |
| 9,785,200 | B1 * | 10/2017 | Knoppert | G06F 1/1681 |
| 9,859,526 | B2 * | 1/2018 | Lee | H01L 51/5256 |
| 9,874,904 | B2 * | 1/2018 | Xu | G06F 1/16 |
| 9,905,795 | B2 * | 2/2018 | Matsueda | G06F 1/1652 |
| 10,078,347 | B2 * | 9/2018 | Aurongzeb | G06F 1/1616 |
| 10,104,210 | B1 * | 10/2018 | Zenebe | H04M 1/0272 |
| 2002/0137478 | A1 * | 9/2002 | Masamura | H04M 1/0214 |
| | | | | 455/550.1 |
| 2003/0095390 | A1 * | 5/2003 | Kim | H05K 1/028 |
| | | | | 361/749 |
| 2005/0245046 | A1 * | 11/2005 | Takafuji | H01L 27/1203 |
| | | | | 438/450 |
| 2008/0246692 | A1 * | 10/2008 | Jeong | G06F 1/1618 |
| | | | | 345/1.3 |
| 2008/0253073 | A1 * | 10/2008 | Kee | G06F 1/1616 |
| | | | | 361/679.04 |
| 2010/0328223 | A1 * | 12/2010 | Mockarram-Dorri | |
| | | | | G06F 3/041 |
| | | | | 345/173 |
| 2011/0285607 | A1 * | 11/2011 | Kim | G06F 1/1616 |
| | | | | 345/1.3 |
| 2012/0135158 | A1 * | 5/2012 | Freer | B82Y 10/00 |
| | | | | 427/532 |
| 2012/0206421 | A1 * | 8/2012 | Cok | G09G 3/2085 |
| | | | | 345/204 |
| 2012/0236484 | A1 * | 9/2012 | Miyake | G06F 1/1616 |
| | | | | 361/679.01 |
| 2013/0083496 | A1 * | 4/2013 | Franklin | G06F 1/1626 |
| | | | | 361/749 |
| 2013/0229762 | A1 | 9/2013 | Whitt, III et al. | |
| 2013/0257685 | A1 * | 10/2013 | Kim | G06F 1/1616 |
| | | | | 345/1.3 |
| 2013/0328914 | A1 * | 12/2013 | Smith | G06F 3/01 |
| | | | | 345/619 |
| 2014/0071101 | A1 * | 3/2014 | Kim | G06F 1/1616 |
| | | | | 345/204 |
| 2015/0100045 | A1 * | 4/2015 | Allen | F04B 49/06 |
| | | | | 604/543 |
| 2015/0255023 | A1 * | 9/2015 | Lee | G09G 3/36 |
| | | | | 345/204 |
| 2015/0366089 | A1 * | 12/2015 | Park | G06F 1/1641 |
| | | | | 361/679.01 |
| 2015/0378557 | A1 * | 12/2015 | Jeong | G06F 3/0488 |
| | | | | 715/835 |
| 2016/0007441 | A1 | 1/2016 | Matsueda | |
| 2016/0195902 | A1 * | 7/2016 | Huh | G06F 1/1652 |
| | | | | 345/156 |
| 2016/0364055 | A1 * | 12/2016 | Huh | G06F 1/1652 |
| 2016/0381014 | A1 * | 12/2016 | Kim | H04L 63/0861 |
| | | | | 726/7 |
| 2017/0063426 | A1 * | 3/2017 | Daigle | H01R 25/006 |
| 2017/0102738 | A1 * | 4/2017 | Park | G06F 1/1652 |
| 2017/0139442 | A1 * | 5/2017 | Yoshizumi | G04G 9/04 |
| 2017/0153663 | A1 * | 6/2017 | Aurongzeb | G06F 1/1616 |
| 2017/0160769 | A1 * | 6/2017 | Xu | G06F 1/16 |
| 2017/0222177 | A1 * | 8/2017 | Matsueda | G06F 1/1652 |
| 2017/0235340 | A1 * | 8/2017 | Jung | G06F 1/1626 |
| | | | | 361/679.26 |
| 2017/0263179 | A1 * | 9/2017 | Aurongzeb | G09G 3/3225 |
| 2018/0113493 | A1 * | 4/2018 | Silvanto | G06F 1/1681 |
| 2018/0128438 | A1 * | 5/2018 | Sreshta | F21S 9/037 |
| 2018/0159069 | A1 * | 6/2018 | Matsueda | G06F 1/1652 |
| 2018/0267571 | A1 * | 9/2018 | Chen | G06F 1/1618 |
| 2018/0329454 | A1 * | 11/2018 | Aurongzeb | G06F 11/325 |

FOREIGN PATENT DOCUMENTS

| | | |
|---|---|---|
| JP | 2015-518189 A | 6/2015 |
| JP | 2016-15618 A | 1/2016 |

* cited by examiner

FIG. 3A
CLOSED MODE

FIG. 3B

FIG. 3C
PARTIAL SCREEN MODE

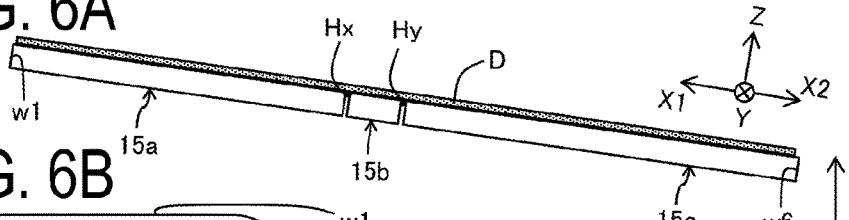
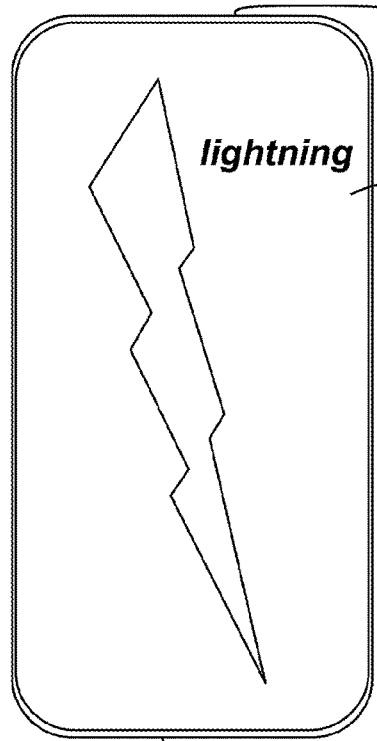
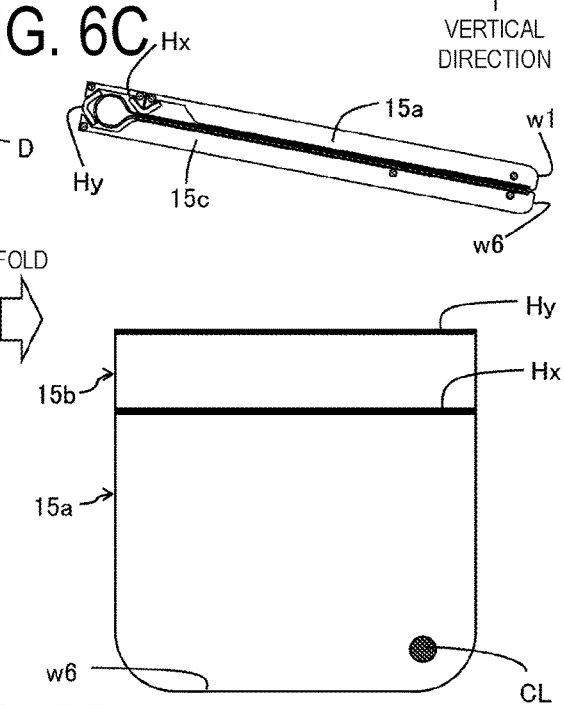
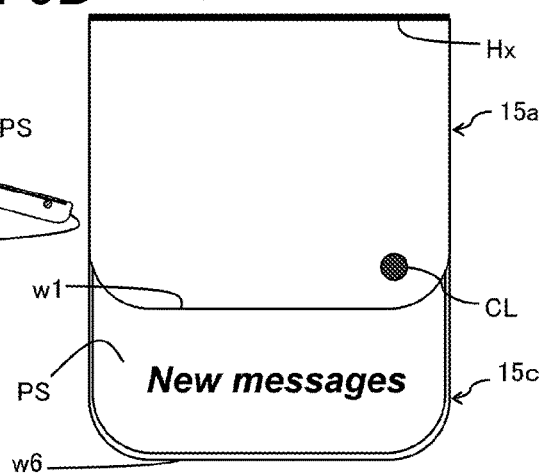

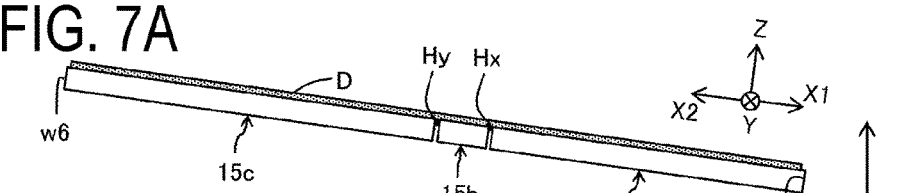
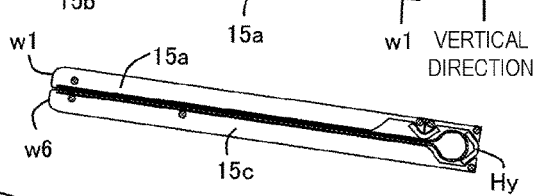
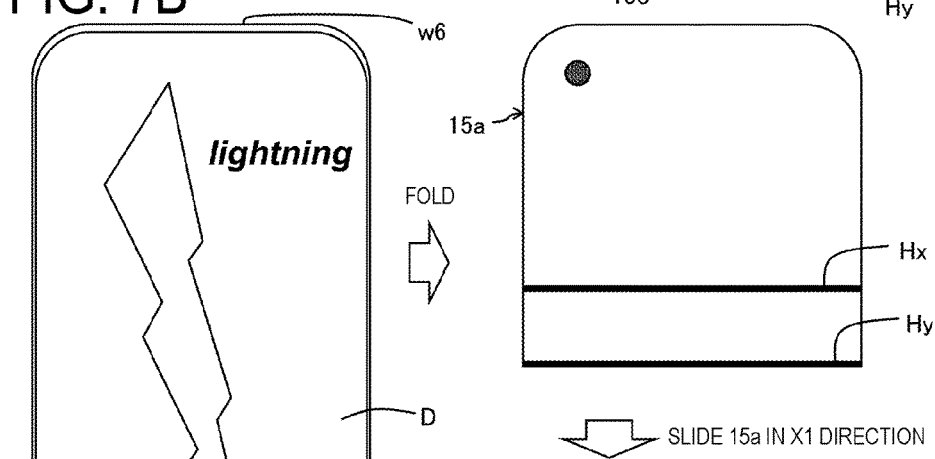
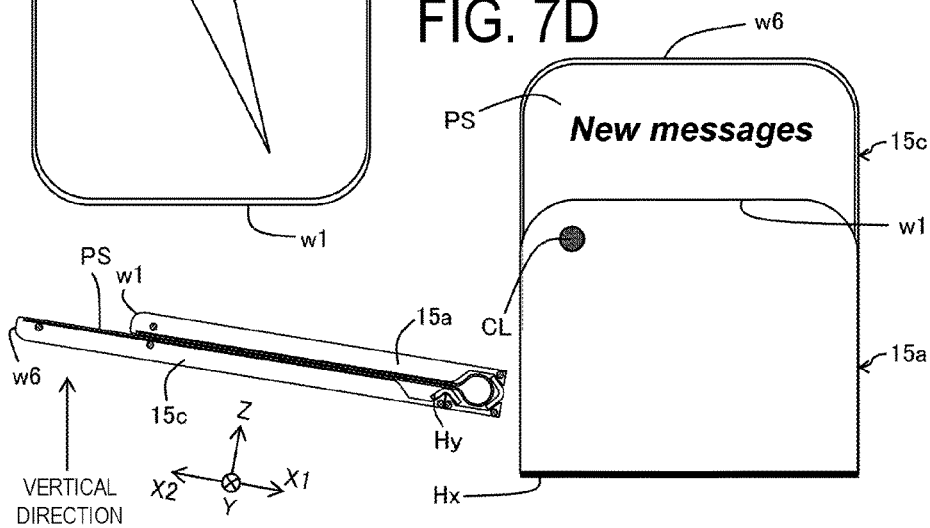

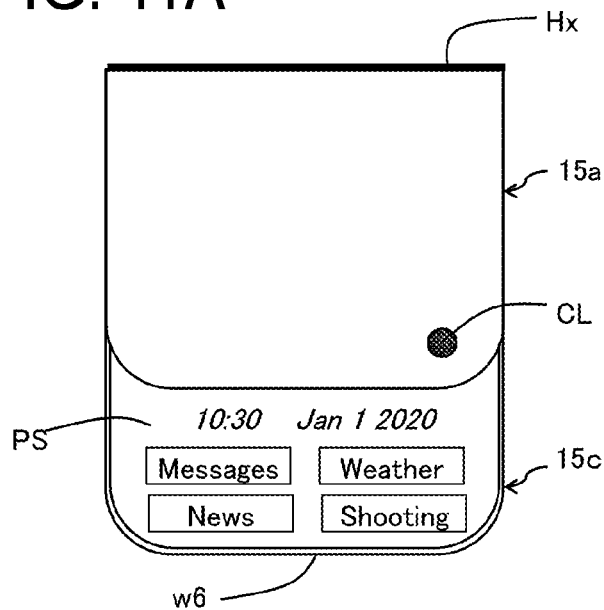
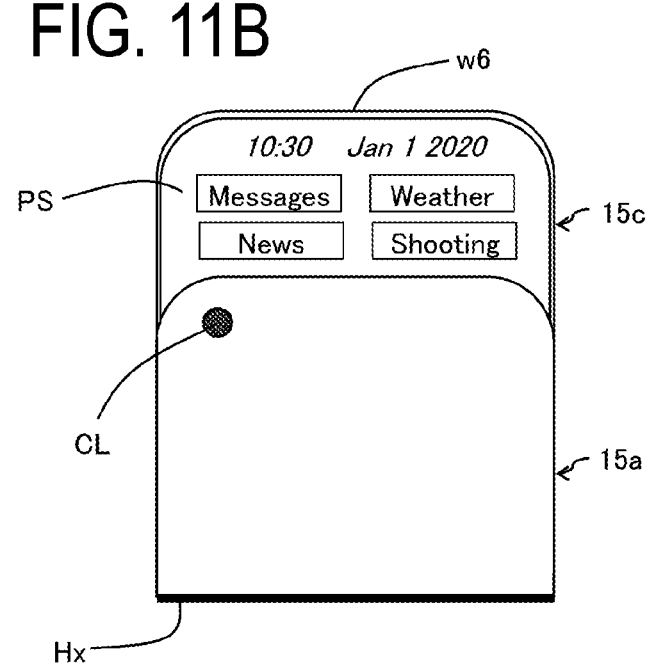

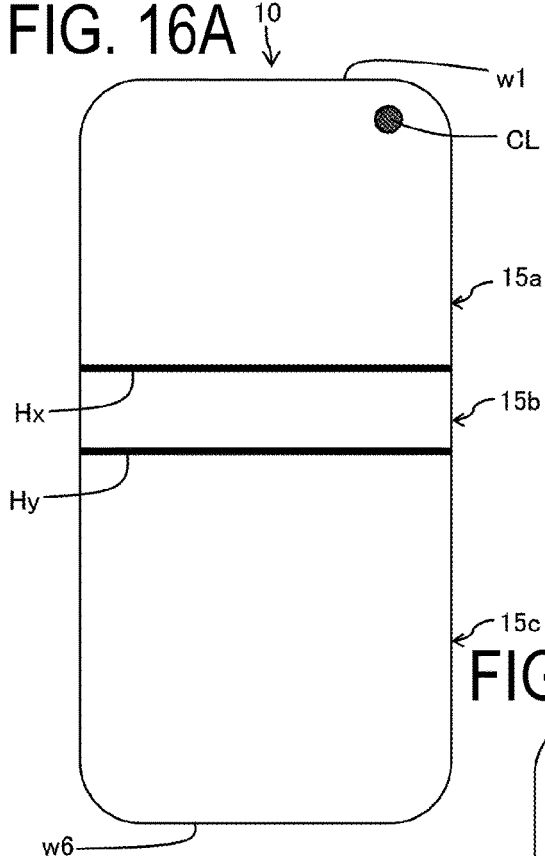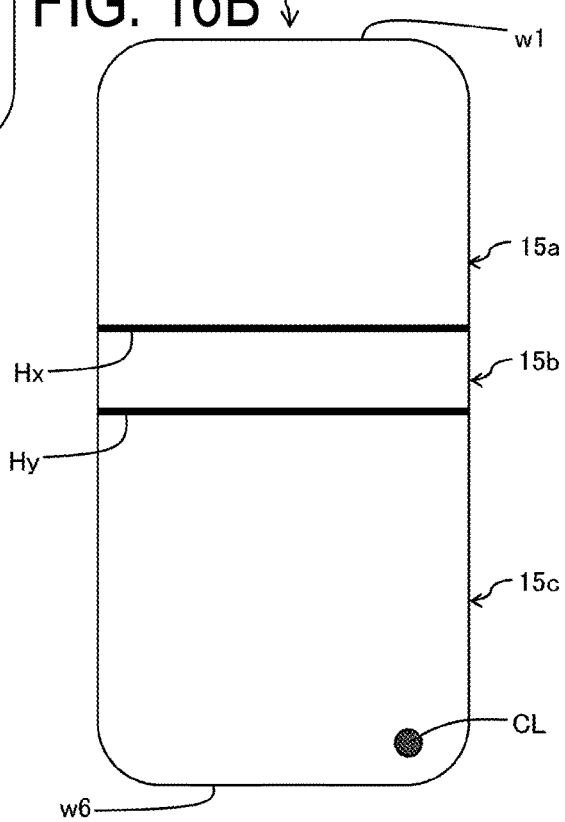

ELECTRONIC DEVICE, CONTROL METHOD OF ELECTRONIC DEVICE, AND PROGRAM

TECHNICAL FIELD

The disclosure relates to an electronic device having a display function.

BACKGROUND ART

PTL 1 discloses a display device that is foldable and is provided with a display unit that is flexible and includes an organic electroluminescent (EL) element.

CITATION LIST

Patent Literature

PTL 1: JP 2016-15618 A (published Jan. 28, 2016)

SUMMARY

Technical Problem

Such a foldable display device requires a user to open (expose) the folded screen in its entirety each time the user wants to view the screen, and is thus cumbersome.

Solution to Problem

An electronic device according to a first aspect of the disclosure includes a first housing, a second housing, a third housing, a first hinge connecting the first housing and the second housing, a second hinge connecting the second housing and the third housing, and a display panel that is continuous and flexible. The display panel includes a display face and a rear face on an opposite side of the display face, the rear face facing upper faces of the first housing, the second housing, and the third housing. The first housing, the second housing, and the third housing are disposed side-by-side in a first direction, exposing the display face in its entirety, in a case that the first hinge and the second hinge are set to open states. The third housing is larger in size in the first direction than the first housing and the second housing. The display face is partially exposed in a case that the first hinge and the second hinge are set to a closed state and an open state, respectively.

Advantageous Effects of Disclosure

The present disclosure makes it possible to expose just a portion of a display face, allowing a user to not open the display face in its entirety when only a portion of the display face needs to be checked.

BRIEF DESCRIPTION OF DRAWINGS

FIG. 1A is a side view in full screen mode, FIG. 1B is a cross-sectional view in full screen mode, and FIG. 1C is a cross-sectional view illustrating a configuration of a display panel provided to the electronic device.

FIG. 2A is a top view in full screen mode, and FIG. 2B is a bottom view (back view) in full screen mode.

FIGS. 3A to 3C illustrate the configuration of the electronic device according to the present embodiment. FIG. 3A is a cross-sectional view in closed mode, FIG. 3B is a cross-sectional view illustrating a state of transition from closed mode to partial screen mode, and FIG. 3C is a cross-sectional view in partial screen mode.

FIG. 4A is a top view in closed mode, and FIG. 4B is a top view in partial screen mode.

FIGS. 6A to 6D illustrate the electronic device during use in a forward direction. FIG. 6A is a side view, FIG. 6B is a top view, FIG. 6C is a cross-sectional view and a top view, and FIG. 6D is a cross-sectional view and a top view.

FIGS. 7A to 7D illustrate a method of use of the electronic device in a reverse direction. FIG. 7A is a side view, FIG. 7B is a top view, FIG. 7C is a cross-sectional view and a top view, and FIG. 7D is a cross-sectional view and a top view.

FIGS. 11A and 11B are schematic views illustrating display examples of icons in partial screen mode.

FIGS. 16A and 16B are top views illustrating a layout example of a lens for image taking in the electronic device.

DESCRIPTION OF EMBODIMENTS

Embodiments of the disclosure will be described below with reference to FIGS. 1A to 17. These embodiments, however, are merely examples. Direction X (a length direction of an electronic device), direction Y (a width direction of the electronic device), and direction Z (a thickness direction of the electronic device) described below are relative to the electronic device serving as standard when the electronic device is in full screen mode, partial screen mode, or closed mode. For example, when the electronic device is tilted with respect to a horizontal plane, direction X is also tilted.

Figure 1A:
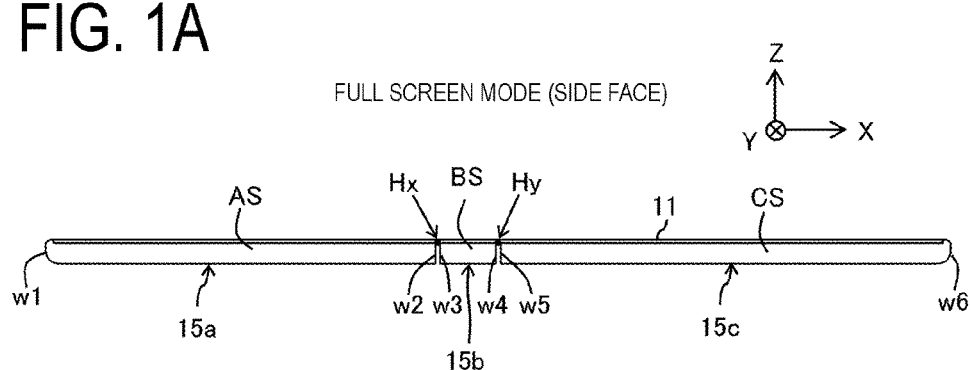
FIGS. 1A to 1C illustrate a configuration of an electronic device according to the present embodiment.
Figure 1B:
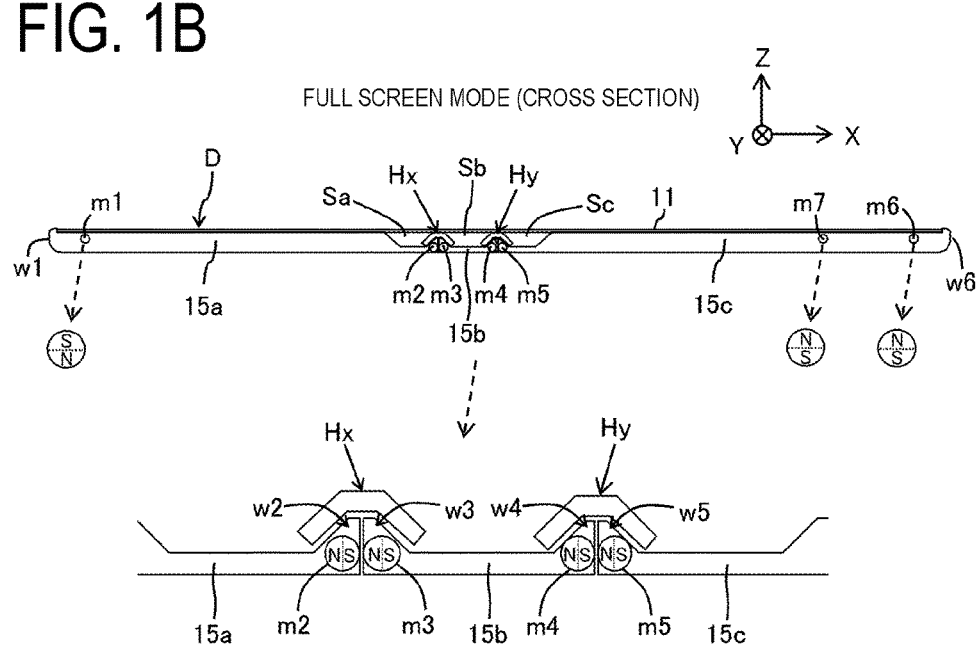
Figure 1C:
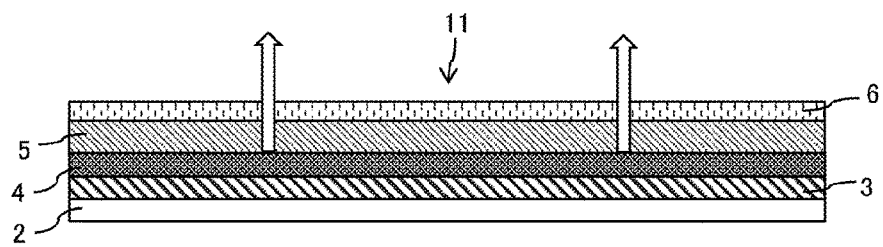
Figure 2A:
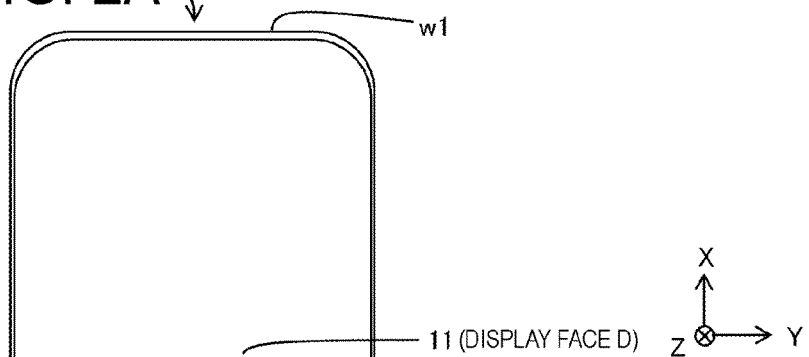
FIGS. 2A and 2B illustrate the configuration of the electronic device according to the present embodiment.
Figure 2B:
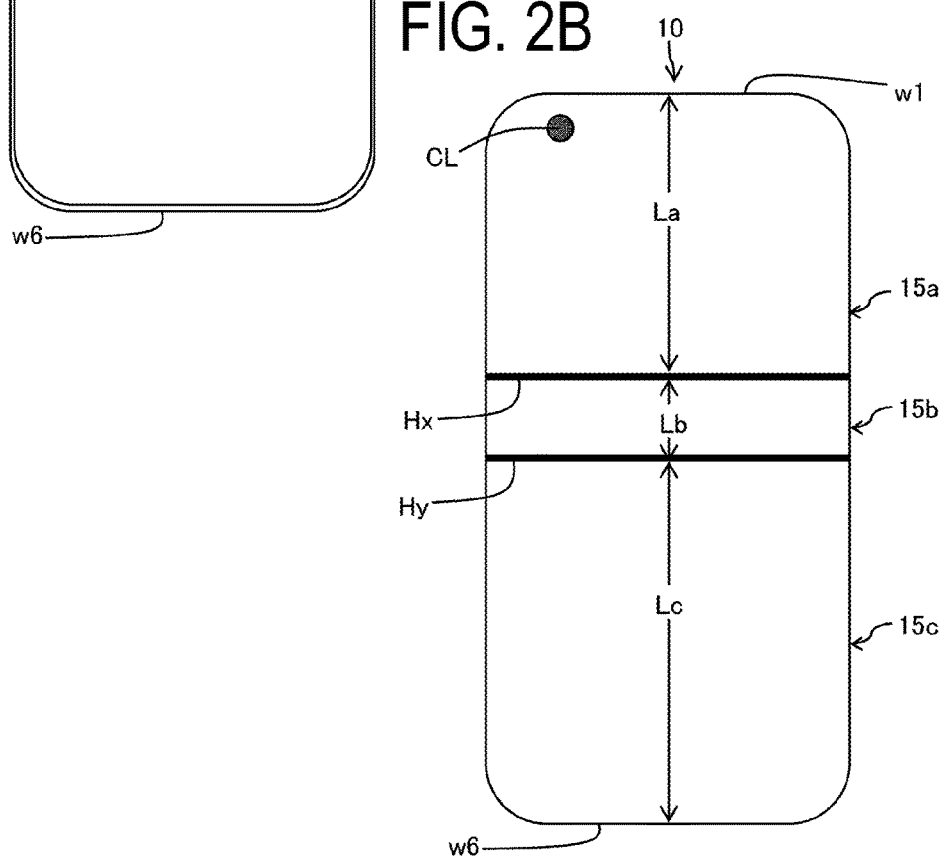

FIGS. 1A to 1C illustrate a configuration of an electronic device according to the present embodiment. FIG. 1A is a side view in full screen mode, FIG. 1B is a cross-sectional view in full screen mode, and FIG. 1C is a cross-sectional view illustrating a configuration of a display panel provided to the electronic device. FIGS. 2A and 2B illustrate the configuration of the electronic device according to the present embodiment. FIG. 2A is a top view in full screen mode, and FIG. 2B is a bottom view (back view) in full screen mode. The cross-sectional view of the electronic device is a cross-sectional view from a plane parallel to direction Z that includes a center line (parallel to direction X) of a display face.

As illustrated in FIGS. 1A to 2B, an electronic device 10 according to the present embodiment is a high-performance mobile phone (a so-called smartphone), and includes a first housing to a third housing 15a to 15c, a first hinge Hx connecting the first housing 15a and the second housing 15b, a second hinge Hy connecting the second housing 15b and the third housing 15c, and a display panel 11 that is continuous and flexible. (In FIG. 1A, gaps between the housings are largely drawn for convenience of explanation in FIG. 1A. The gaps, however, are not actually substantially nonexistent.) The first hinge Hx and the second hinge Hy are both flexible hinges made from a material having flexibility, and examples of such a material include a rubber, a silicone, and a fabric. Note that a metal or a resin with a plurality of through holes or depression patterns formed therein, or a material obtained by layering such a metal or a resin with a rubber or a silicon may be used.

Given a longitudinal direction of the electronic device 10 as direction X, a direction perpendicular to direction X as direction Y (width direction), and a direction perpendicular to direction X and direction Y as direction Z (thickness direction), the first housing 15a includes a housing wall AS in direction X and direction Z (along an X-Z plane), and housing walls w1, w2 in direction Y and direction Z (along a Y-Z plane); the second housing 15b includes a housing wall BS in direction X and direction Z (along the X-Z plane), and housing walls w3, w4 in direction Y and direction Z (along the Y-Z plane); and the third housing 15c includes a housing wall CS in direction X and direction Z (along the X-Z plane), and housing walls w5, w6 in direction Y and direction Z (along the Y-Z plane). The housing wall w1 is an edge on the first housing 15a side of the electronic device 10, and the housing wall w6 is an edge on the third housing 15c side of the electronic device 10.

The first hinge Hx is fixed to inner face sides of the housing walls w2, w3 adjacent thereto, and the second hinge Hy is fixed to inner face sides of the housing walls w4, w5 adjacent thereto. That is, a portion of the first hinge Hx is positioned between the housing wall w2 and the display panel 11, and another portion of the first hinge Hx is positioned between the housing wall w3 and the display panel 11. Furthermore, a portion of the second hinge Hy is positioned between the housing wall w4 and the display panel 11, and another portion of the second hinge Hy is positioned between the housing wall w5 and the display panel 11.

The sizes (lengths) in direction X, as illustrated in FIG. 2B, are such that a length Lb of the second housing 15b<a length La of the first housing 15a<a length Lc of the third housing 15c. Specifically, the length Lc of the third housing 15c is equal (substantially equal) to the sum of the lengths of the first housing and the second housing. Note that the first housing to the third housing 15a to 15c are equal in size in direction Y (width direction) and in direction Z (thickness).

The display panel 11 is provided so that a rear face thereof (the face on the side opposite to a display face D) faces upper faces of the first to third housings 15a to 15c. Note that, to ensure a radius of curvature (R) when the display panel is folded, a space Sa is provided near the housing wall w2 of the first housing 15a, a space Sc is provided near a housing wall w5 of the third housing 15c, and an interior of the second housing 15b is established as a space Sb.

The display panel 11 is a flexible organic light emitting diode (OLED) panel and, as illustrated in FIG. 1C, is provided with a thin film transistor (TFT) array layer 3, an OLED element layer 4, a sealing layer 5, and a function layer 6, in that order. The TFT array layer 3 includes a TFT, a signal line, and a positive electrode, and the OLED element layer 4 includes an electrically active layer, a light emitting layer, and a negative electrode. A plurality of pixels are formed by the TFT array layer 3 and the OLED element layer 4. Furthermore, the function layer 6 includes an optical film, a touch sensor sheet, and a protection film.

As illustrated in FIG. 1B, in the electronic device 10, when the first hinge Hx and the second hinge Hy are each set to an open state, the mode is full screen mode where the first housing to the third housing 15a to 15c are disposed side-by-side in direction X, exposing the display face D in its entirety. The display face side and the back face side in full screen mode are as illustrated in FIGS. 2A and 2B, respectively. As illustrated in FIG. 2B, a lens CL for image taking is provided on a bottom face of the first housing 15a (back face of the electronic device 10), near the housing wall w1.

Figures 3A, 3B, 3C:
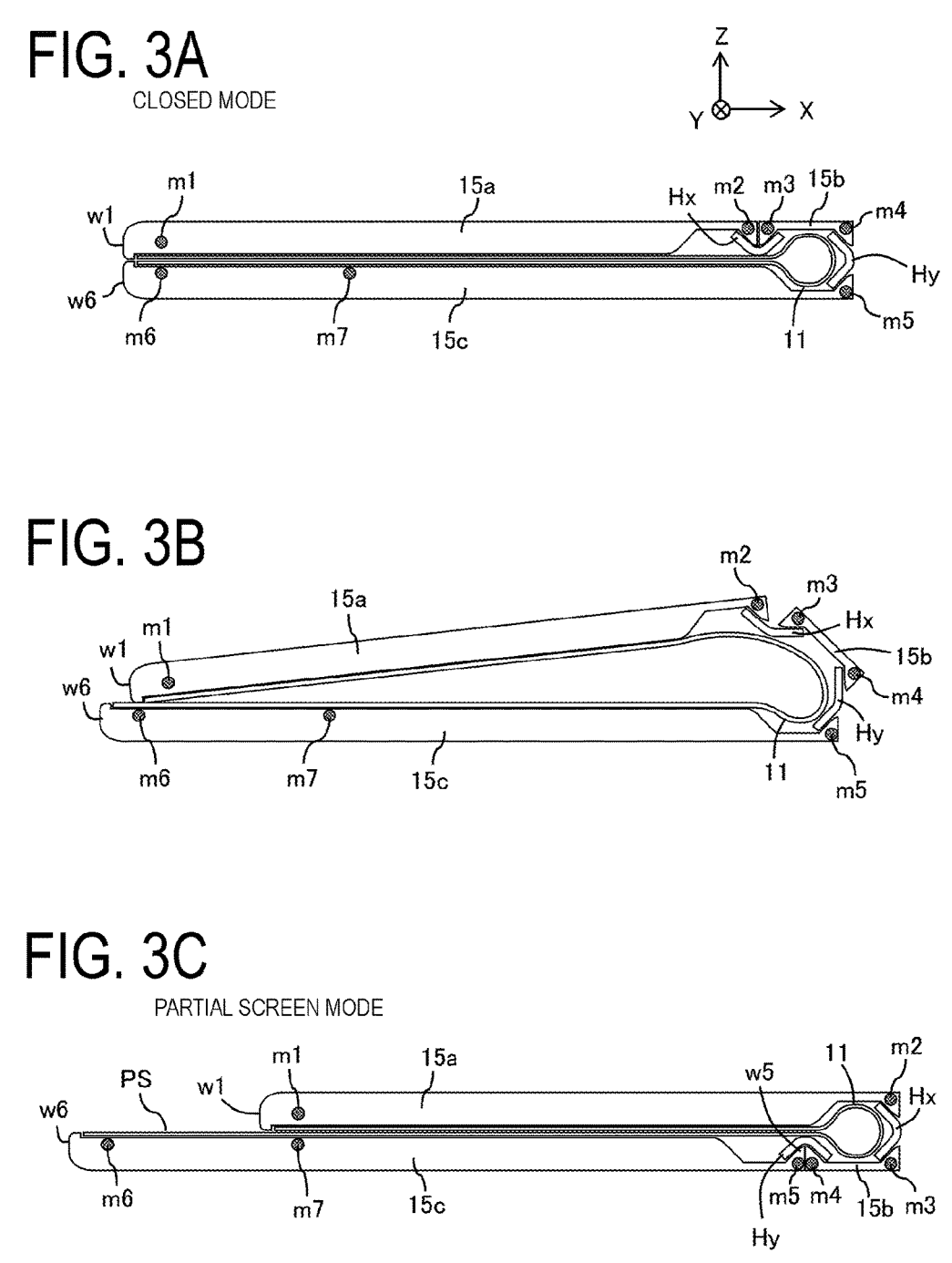
Figure 4A:
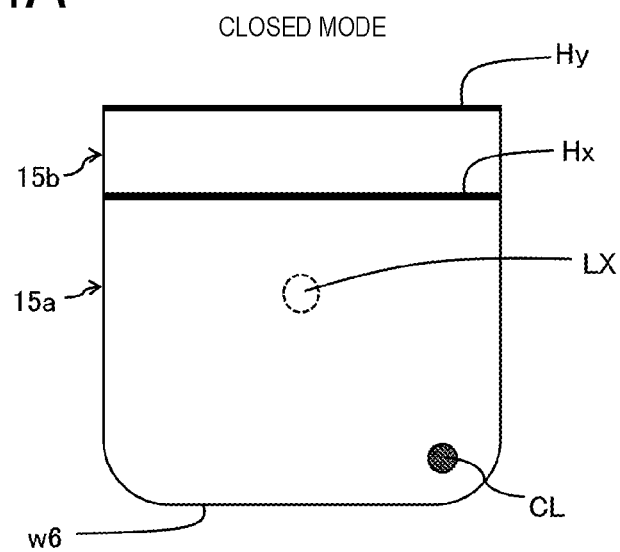
FIGS. 4A and 4B illustrate the configuration of the electronic device according to the present embodiment.
Figure 4B:
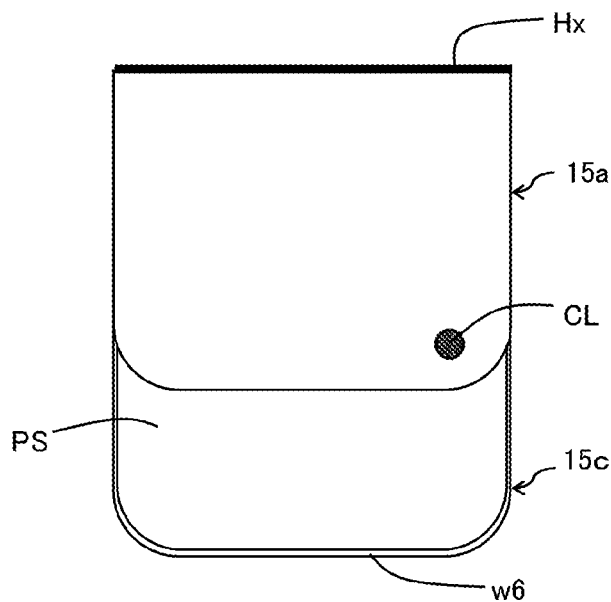

FIGS. 3A to 3C illustrate the configuration of the electronic device according to the present embodiment. FIG. 3A is a cross-sectional view in closed mode, FIG. 3B is a cross-sectional view illustrating a transition process from closed mode to partial screen mode, and FIG. 3C is a cross-sectional view in partial screen mode. FIGS. 4A and 4B illustrate the configuration of the electronic device according to the present embodiment. FIG. 4A is a top view in closed mode, and FIG. 4B is a top view in partial screen mode. Note that the cross-sectional view of the electronic device is a cross-sectional view from a plane parallel to direction Z that includes a center line (parallel to direction X) of the display face.

As illustrated in FIGS. 1A to 3A, when the first housing 15a and the second housing 15b disposed side-by-side in direction X are rotated from full screen mode toward the third housing 15c with the second hinge Hy serving as an axis, thereby setting the first hinge Hx to an open state and the second hinge Hy to a closed state, the mode changes to closed mode (refer to FIG. 4A) where the first housing 15a, the second housing 15b, and the third housing 15c overlap so that the housing wall w1 matches the housing wall w6 in relation to the position in direction X, and the display panel 11 is folded in two with the display face D stored on an inner side in its entirety (in the space between the first and second housings 15a and 15b, and the third housing 15c).

In closed mode, R of a bending portion of the display panel 11 is ensured by the space provided to the second and third housings 15b, 15c. In this closed mode, as illustrated in FIG. 4A, one portion area LX of the bottom face of the first housing 15a emits light, thereby notifying the user of incoming calls and the like. Note that the color or pattern of the emitted light is varied according to the type of incoming call.

As illustrated in FIGS. 3B and 3C, when the first housing 15a is slid in direction X (rightward in the drawing) from closed mode, thereby setting the first hinge Hx to a closed state and the second hinge Hy to an open state, the mode changes to partial screen mode where the second and the third housings 15b and 15c disposed side-by-side in direction X and the first housing 15a overlap so that the housing wall w1 is between the housing walls w5, w6 in relation to the position in direction X, exposing a partial screen PS, which is a portion of the display face D (refer to FIG. 4B). Note that the partial screen PS overlaps with a portion close to the housing wall w6 of the third housing 15c. In partial screen mode, R of the bending portion of the display panel 11 is ensured by the space provided to the first and second housings 15a, 15b.

Figure 5:
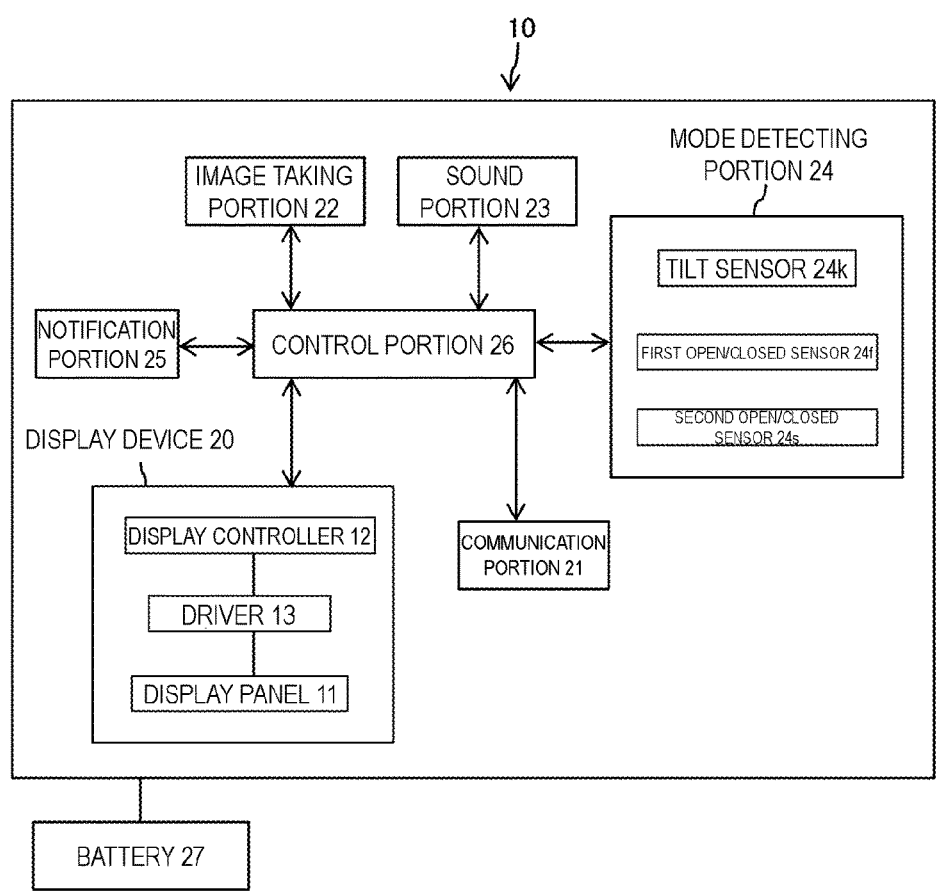
FIG. 5 is a block view illustrating the configuration of the electronic device.

FIG. 5 is a block view illustrating the configuration of the electronic device. As illustrated in FIG. 5, the electronic device 10 includes a display device 20, a communication portion 21, an image taking portion 22, a sound portion 23, a mode detecting portion 24, a notification portion 25, a control portion 26, and a battery 27.

The display device 20 includes the display panel 11, a driver 13 that drives the display panel 11, and a display controller 12 that controls the driver 13 and displays images. The communication portion 21 includes a transceiver circuit, and transmits and receives various data. The image taking portion 22 includes a lens and an image sensor, and records images. The sound portion 23 includes a speaker and an audio sensor, and outputs and records sounds. The mode detecting portion 24 includes a tilt sensor 24k that detects a tilt of the electronic device 10, a first open/closed sensor 24f that detects the open/closed state of the first hinge Hx in FIGS. 1A to 1C, and a second open/closed sensor 24s that detects the open/closed state of the second hinge Hy in FIGS. 1A to 1C, and detects a mode (state) of the electronic device 10. The notification portion 25 includes a light emitting element such as an LED, and notifies (indicates) information to the user in closed mode by an emitted color, blinking pattern, and the like.

The control portion 26 includes a processor and a memory, and controls these by exchanging signals and data between the display device 20 and each of the portions 21 to 25. The battery 27 supplies power to the display device 20 and each of the portions 21 to 26 in the electronic device. Note that the display device 20, each of the portions 21 to 26, and the battery 27 may be configured so that at least a portion of the components are stored in the first to third housings 15a to 15c in FIGS. 1A to 1C.

As illustrated in FIGS. 1A to 3C, magnets m1 to m6 are provided correspondingly to the housing walls w1 to w6 of the first to third housings 15a to 15c. That is, the magnet m1 is provided near the display panel and the housing wall w1, the magnet m6 is provided near the display panel and the housing wall w6, the magnet m2 is provided to the bottom face side of the housing wall w2, the magnet m3 is provided to the bottom face side of the housing wall w3, the magnet m4 is provided to the bottom face side of the housing wall w4, and the magnet m5 is provided to the bottom face side of the housing wall w5. Furthermore, a magnet m7 is provided to the third housing 15c in a position separated by a certain distance (a value corresponding to the size of the partial screen PS in direction X) from the position of the magnet m6 in direction X.

In the magnets m1, m6, m7, magnetic poles are disposed side by side in direction Z with, for example, the display panel side of the magnet m1 being pole S and the display panel sides of magnets m6, m7 being poles N. Furthermore, in the magnets m2 to m5, the magnetic poles are disposed side-by-side in direction X with, for example, the housing wall w3 side of the magnet m2 being pole S, the housing wall w2 side of the magnet m3 being pole N, the housing wall w5 side of the magnet m4 being pole S, and the housing wall w4 side of the magnet m5 being pole N.

For example, in full screen mode, as illustrated in FIG. 1B, the state of the first to third housings 15a to 15c disposed side-by-side in direction X is maintained by a magnetic force of the magnets m2, m3 in direction X and a magnetic force of the magnets m4, m5 in direction X.

Furthermore, in closed mode, as illustrated in FIG. 3A, the state of the first housing 15a and the second housing 15b, disposed side-by-side in direction X, overlapping with the third housings 15c so that the housing wall w1 matches the housing wall w6 in relation to the position in direction X is maintained by the magnetic force of the magnets m2, m3 in direction X and a magnetic force of the magnets m1, m6 in direction Z.

Furthermore, in partial screen mode, as illustrated in FIG. 3C, the state of the first housing 15a overlapping with the second housing 15b and the third housing 15c disposed side-by-side in direction X so that the housing wall w1 is between the housing walls w5, w6 in relation to the position in direction X is maintained by the magnetic force of the magnets m4, m5 in direction X and a magnetic force of magnets m1, m7 in direction Z.

The first open/closed sensor 24f in FIG. 5 is a photosensor that includes a light emitting element and a light receiving element, and detects the open/closed state of the first hinge Hx with the light emitting element provided to one of the housing walls w2, w3 and the light receiving element provided to the other. That is, the first open/closed sensor 24f transmits to the control portion 26 an ON signal indicating that the housing walls w2, w3 are close to each other as in FIG. 1B, causing the control portion 26 to determine that the first hinge Hx is in an open state, and transmits to the control portion 26 an OFF signal indicating that the housing walls w2, w3 are separated as in FIG. 3C, causing the control portion 26 to determine that the first hinge Hx is in a closed state.

Similarly, the second open/closed sensor 24s in FIG. 5 is a photosensor that includes a light emitting element and a light receiving element, and detects the open/closed state of the second hinge Hy with the light emitting element provided to one of the housing walls w4, w5 and the light receiving element provided to the other. That is, the second open/closed sensor 24s transmits to the control portion 26 an ON signal indicating that the housing walls w4, w5 are close to each other as in FIG. 1B, causing the control portion 26 to determine that the second hinge Hy is in an open state, and transmits to the control portion 26 an OFF signal indicating that the housing walls w4, w5 are separated as in FIG. 3A, causing the control portion 26 to determine that the second hinge Hy is in a closed state.

The first open/closed sensor 24f and the second open/closed sensor 24s may be magnetic sensors. In this case, for example, the first open/closed sensor 24f provided to the first hinge Hx transmits to the control portion 26 an ON signal indicating the magnetic state in FIG. 1B, causing the control portion 26 to determine that the first hinge Hx is in an open state, and transmits to the control portion 26 an OFF signal indicating the magnetic state in FIG. 3C, causing the control portion 26 to determine that the first hinge Hx is in a closed state. Furthermore, for example, the second open/closed sensor 24s provided to the second hinge Hy transmits to the control portion 26 an ON signal indicating the magnetic state in FIG. 1B, causing the control portion 26 to determine that the second hinge Hy is in an open state, and transmits to the control portion 26 an OFF signal indicating the magnetic state in FIG. 3A, causing the control portion 26 to determine that the second hinge Hy is in a closed state.

The tilt sensor 24k in FIG. 5 outputs a forward direction signal to the control portion 26 when the electronic device 10 is in a horizontal state or a state where the housing wall w6, serving as an edge on the third housing 15c side, is on the vertically downward side, and outputs a reverse direction signal to control portion 26 when the electronic device 10 is in a state where the housing wall w6, serving as an edge on the third housing 15*c* side, is on the vertically upward side.

FIGS. 6A to 6D illustrate the electronic device during use in the forward direction. FIG. 6A is a side view, FIGS. 6B to 6D are top views, FIG. 6C is a cross-sectional view and a top view, and FIG. 6D is a cross-sectional view and a top view.

In full screen mode where the electronic device 10 is in a state where the housing wall w6 is set as the vertically downward side as in FIG. 6A, the tilt sensor 24*k* transmits the forward direction signal to the control portion 26, causing the control portion 26 to determine that the electronic device is in the forward direction and display the full screen with the housing wall w6 side set as the lower side with respect to the display device 20 (refer to FIG. 6B).

From the full screen mode in FIG. 6A, the user can set the mode to closed mode in FIG. 6C by rotating the first housing 15*a* and the second housing 15*b* with the second hinge Hy serving as the axis. Furthermore, from the closed mode in FIG. 6C, the user can set the mode to the partial screen mode in FIG. 6D and check the partial screen PS (disposed between the housing wall w1 and the housing wall w6 in a top view) exposed on the device lower side by sliding (obliquely upward) the first housing 15*a* in direction X1 (from the housing wall w6 toward the second hinge Hy). In partial screen mode where the electronic device 10 is set in a state where the housing wall w6 is set as the vertically downward side as in FIG. 6D, the control portion 26 receives the forward direction signal from the tilt sensor 24*k* and displays a partial screen (displays the partial screen PS only) with the housing wall w6 side set as the lower side with respect to the display device 20.

FIGS. 7A to 7D illustrate the electronic device during use in the reverse direction. FIG. 7A is a side view, FIGS. 7B to 7D are top views, FIG. 7C is a cross-sectional view and a top view, and FIG. 7D is a cross-sectional view and a top view.

In full screen mode where the electronic device 10 is set in a state where the housing wall w6 is set as the vertically upward side as in FIG. 7A, the tilt sensor 24*k* transmits the reverse direction signal to the control portion 26, causing the control portion 26 to determine that the electronic device is in the reverse direction and display the full screen with the housing wall w6 side set as the upper side with respect to the display device 20 (refer to FIG. 7B).

From the full screen mode in FIG. 7A, the user can set the mode to closed mode in FIG. 7C by rotating the first housing 15*a* and the second housing 15*b* with the second hinge Hy serving as the axis. Furthermore, from the closed mode in FIG. 7C, the user can set the mode to the partial screen mode in FIG. 7D and check the partial screen PS (disposed between the housing wall w1 and the housing wall w6 in a top view) exposed on the device upper side by sliding (obliquely downward) the first housing 15*a* in direction X1 (from the housing wall w6 toward the second hinge Hy). In partial screen mode where the electronic device 10 is set in a state where the housing wall w6 is set as the vertically upward side as in FIG. 7D, the control portion 26 receives the reverse direction signal from the tilt sensor 24*k* and displays a partial screen (displays the partial screen PS only) with the housing wall w6 side set as the upper side with respect to the display device 20.

Figure 8A:
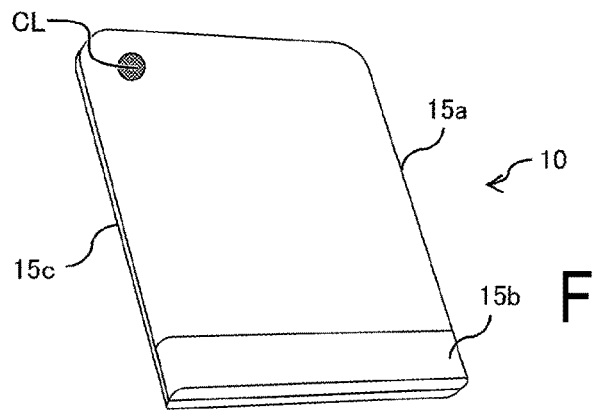
FIGS. 8A to 8C are perspective views illustrating a method of use of the electronic device in the reverse direction.
Figure 8D:
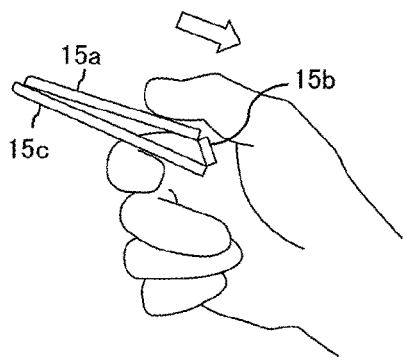
FIG. 8D is a schematic view illustrating a transition process from the closed mode illustrated in FIG. 8A to the partial screen mode illustrated in FIG. 8C.
Figure 8B:
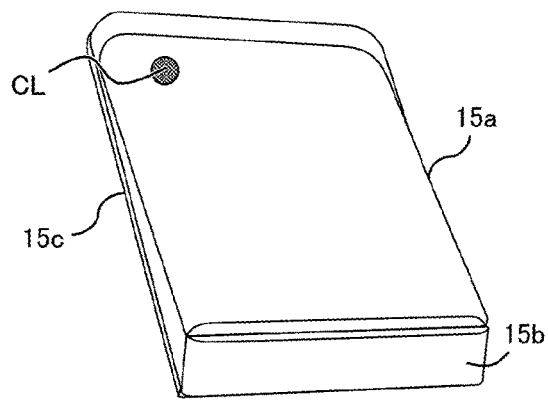
Figure 8C:
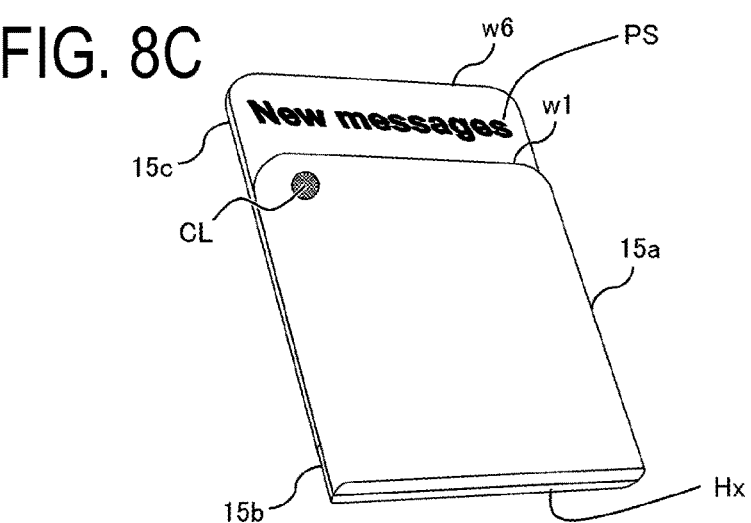

Here, FIGS. 8A to 8C illustrate a perspective view of a method of use of the electronic device in the reverse direction and FIG. 8D illustrates a transition (slide) process from the closed mode illustrated in FIG. 8A to the partial screen mode illustrated in FIG. 8C.

Figure 9:
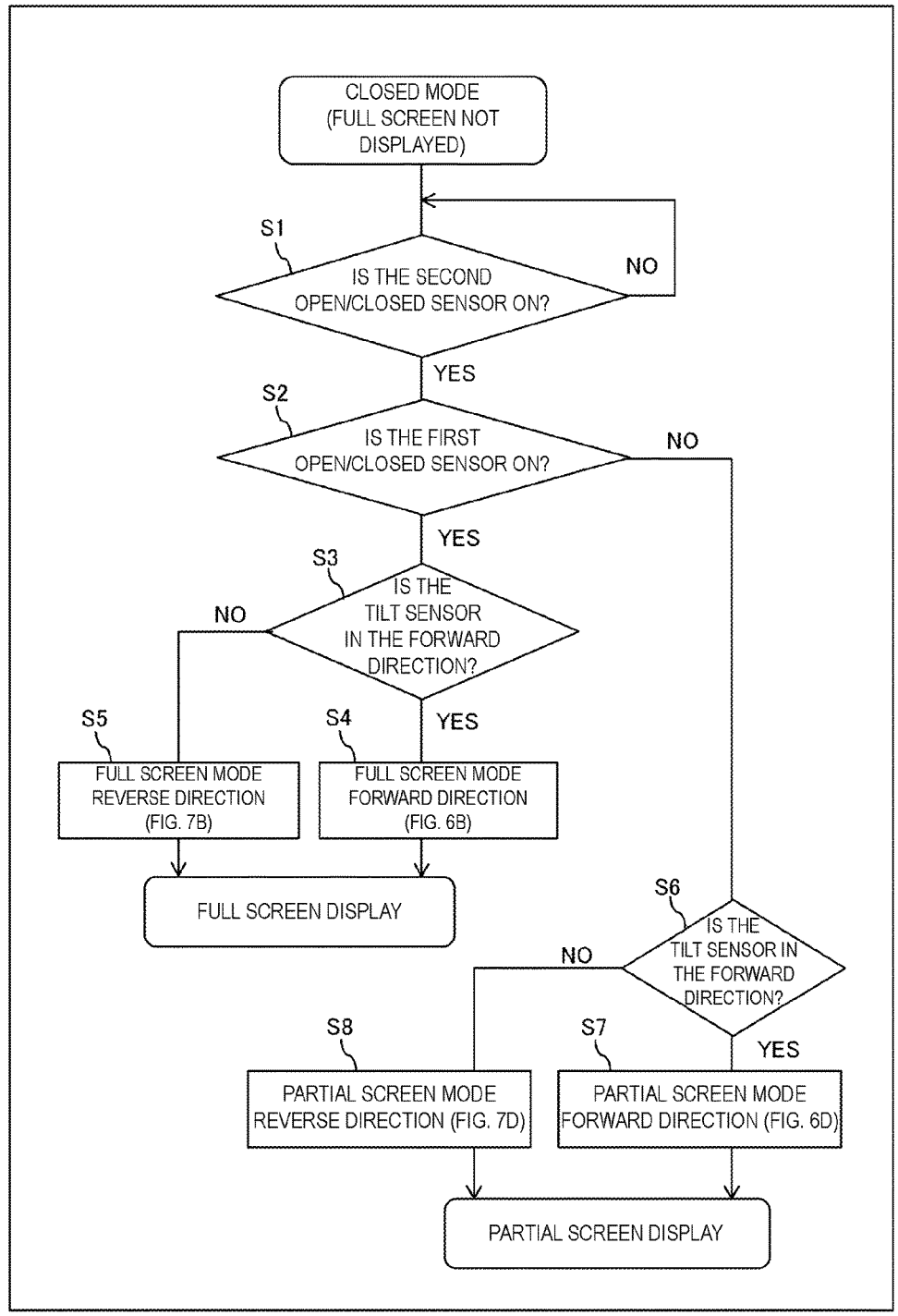
FIG. 9 is a flowchart showing a mode setup procedure of the electronic device.

FIG. 9 is a flowchart illustrating a mode setup procedure of the electronic device. First, when the electronic device 10 is set to closed mode (sleep mode), the control portion 26 causes the display panel 11 to be hidden. In closed mode, as illustrated in FIG. 4A, the one portion area LX of the bottom face of the first housing 15*a* emits light, notifying the user accordingly.

The control portion 26 determines whether the second open/closed sensor 24*s* is outputting an ON signal in step S1 and, in a case of YES in step S1, determines whether the first open/closed sensor 24*f* is outputting an ON signal in step S2. In a case of YES in step S2, the control portion 26 determines whether the output of the tilt sensor 24*k* is a forward direction signal (the electronic device 10 is in a horizontal state or a state where the housing wall w6 serving as an edge on the third housing 15*c* side is set as the vertically downward side) in step S3, and causes the electronic device 10 to start in full screen mode in the forward direction in FIG. 6B in a case of YES in step S3, or causes the electronic device 10 to start in full screen mode in the reverse direction in FIG. 7B in a case of NO (the electronic device 10 is in a state where the housing wall w6 is set as the vertically upward side) in step S3. As a result, the electronic device 10 is set to full screen mode and the full screen is displayed on the display panel 11 (the pixels corresponding to the full screen are driven).

On the other hand, in a case of NO in step S2, the control portion 26 determines whether the output of the tilt sensor 24*k* is a forward direction signal (the electronic device 10 is in a horizontal state or a state where the housing wall w6 serving as an edge on the third housing 15*c* side is set as the vertically downward side) in step S6, and causes the electronic device 10 to start in partial screen mode in the forward direction in FIG. 6D in a case of YES in step S6, or causes the electronic device 10 to start in partial screen mode in the reverse direction in FIG. 7D in a case of NO (the electronic device 10 is in a state where the housing wall w6 is set as the vertically upward side) in step S6. As a result, the electronic device 10 is set to partial screen mode and the display panel 11 is partially displayed (only the pixels corresponding to the partial screen PS are driven).

While FIG. 9 describes a case in which startup is performed in full screen mode or partial screen mode from closed mode, the setting is switched to partial screen mode when the first open/closed sensor 24*f* outputs an OFF signal after the mode is set to full screen mode, and to closed mode when the second open/closed sensor 24*s* outputs an OFF signal after the mode is set to full screen mode.

Furthermore, the setting is switched to full screen mode when the first open/closed sensor 24*f* outputs an ON signal after the mode is set to partial screen mode, and to closed mode when the second open/closed sensor 24*s* outputs an OFF signal after the mode is set to partial screen mode.

Note that the contents of each step in FIG. 9 are realized by, for example, the processor of the control portion 26 executing a program stored in memory.

Figure 10:
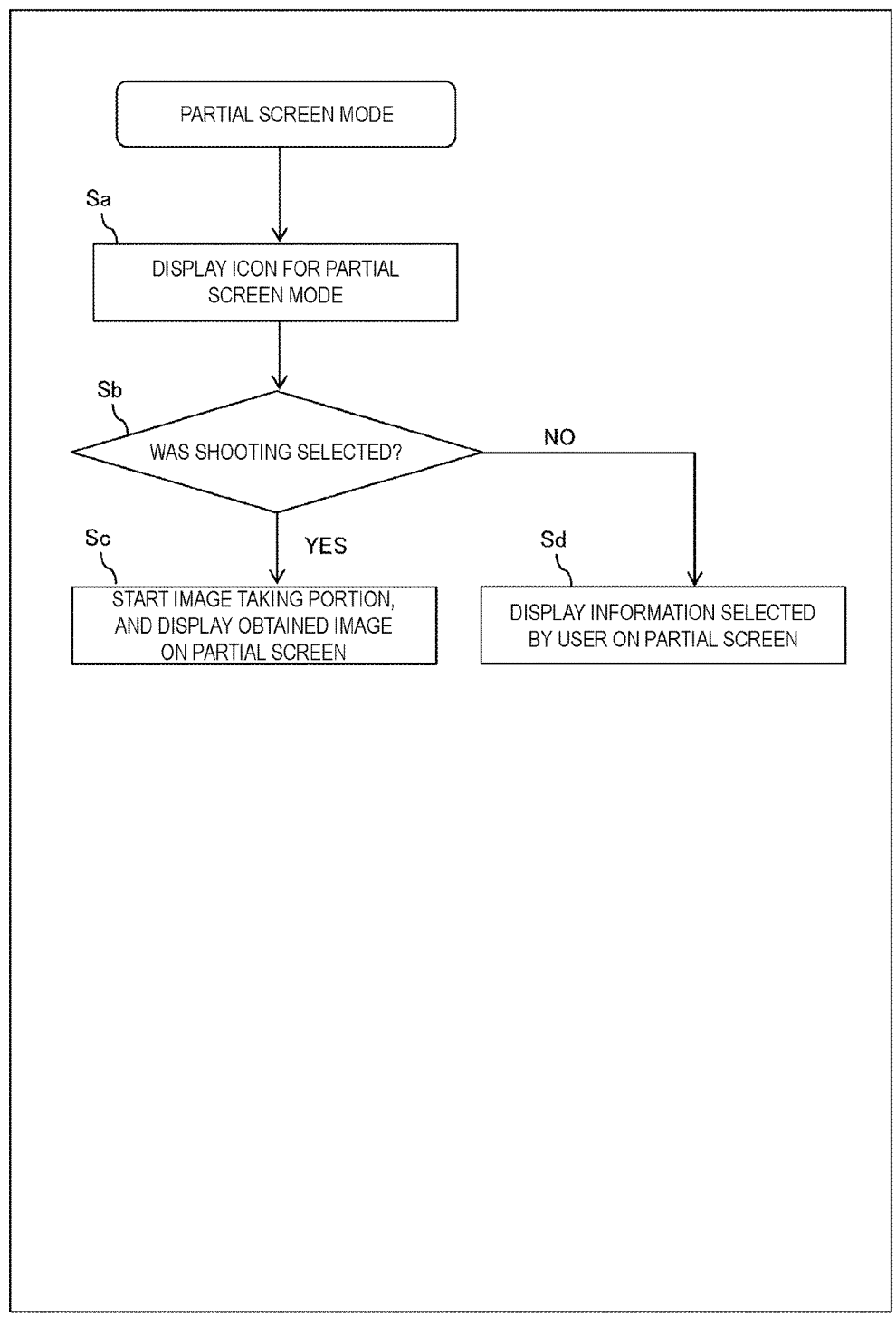
FIG. 10 is a flowchart showing a display procedure in partial screen mode.
Figure 12A:
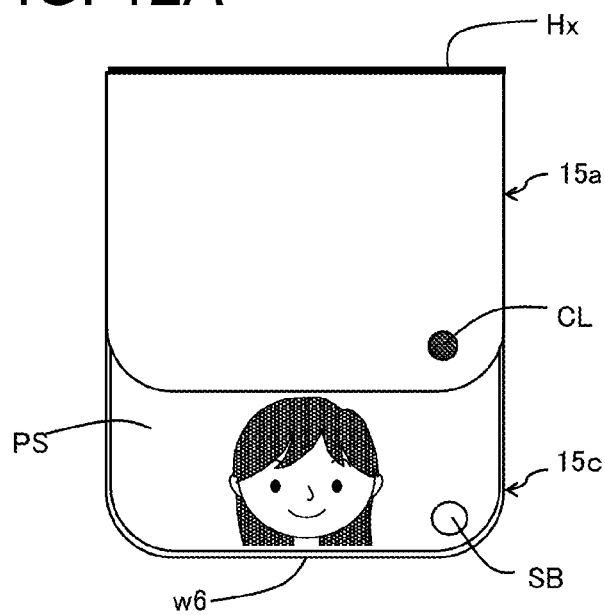
FIGS. 12A and 12B are schematic views illustrating image taking examples in partial screen mode.
Figure 12B:
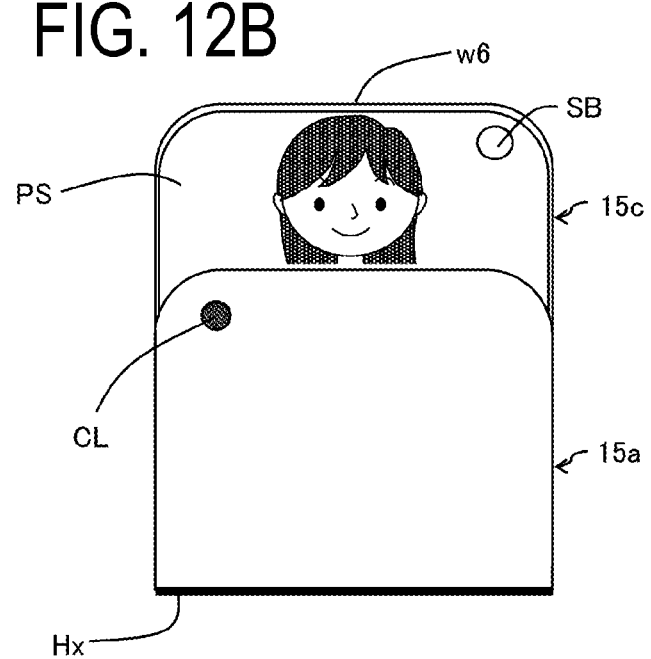

FIG. 10 is a flowchart showing a display procedure with the electronic device in partial screen mode. FIGS. 11A and 11B are schematic views illustrating display examples of icons with the electronic device in partial screen mode. FIGS. 12A and 12B are schematic views illustrating display examples of the partial screen (during image taking), and FIGS. 13A and 13B are schematic views illustrating display examples of the partial screen (during information display).

When startup is performed in partial screen mode, as illustrated in FIG. 10, the control portion 26 causes the time as well as icons (Messages, News, Weather, Shooting) for partial screen mode to be displayed as in FIG. 11A when the electronic device 10 is in the forward direction (in a horizontal state or a state where the housing wall w6 serving as an edge on the third housing 15c side is set as the vertically downward side), or as in FIG. 11B when the electronic device 10 is in the reverse direction (in a state where the housing wall w6 is set as the vertically upward side) (step Sa). Then, in step Sb, when the user selects Shooting (YES) (to take a selfie, for example), the control portion 26 starts the image taking portion 22, and causes the image (preview image) obtained via the lens CL to be displayed on the partial screen PS as in FIG. 12A when the electronic device 10 is in the forward direction, or as in FIG. 12B when the electronic device 10 is in the reverse direction (step Sc). In this case, for example, the image is taken when the user touches a software button SB on the partial screen PS.

Figure 13A:
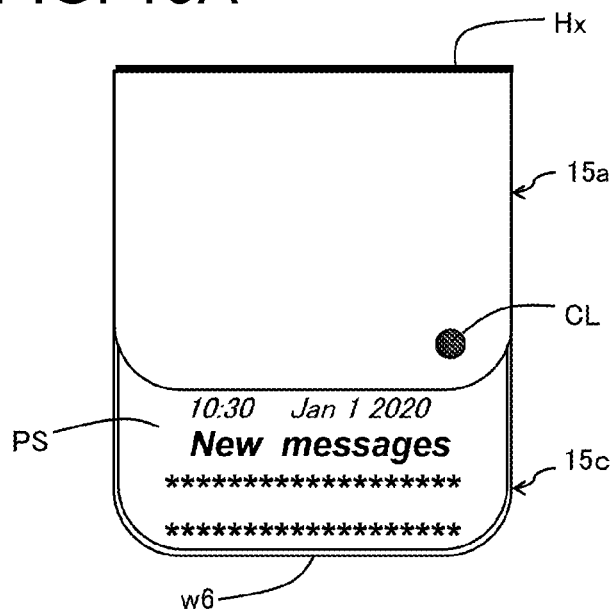
FIGS. 13A and 13B are schematic views illustrating information display examples in partial screen mode.
Figure 13B:
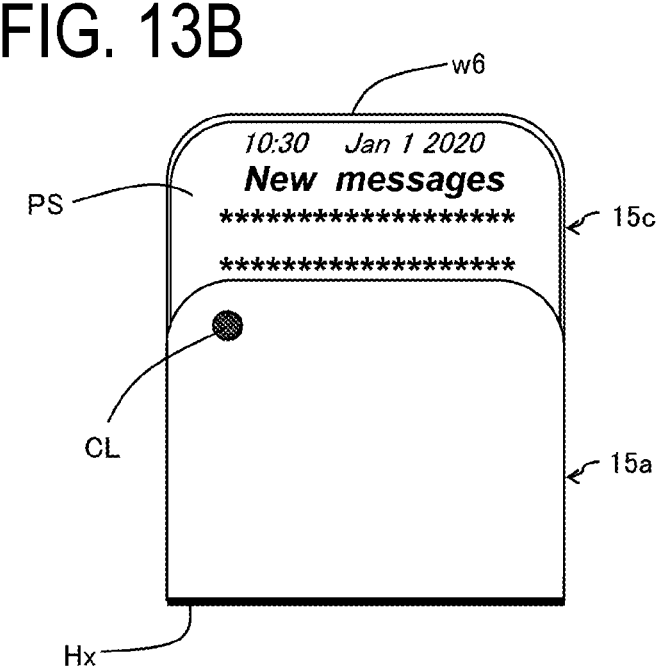

On the other hand, when NO in step Sb (when the user selects to display information), the selected information (Messages, for example) is displayed on the partial screen PS as in FIG. 13A when the electronic device 10 is in the forward direction, or as in FIG. 13B when the electronic device 10 is in the reverse direction (step Sd).

Figure 14:
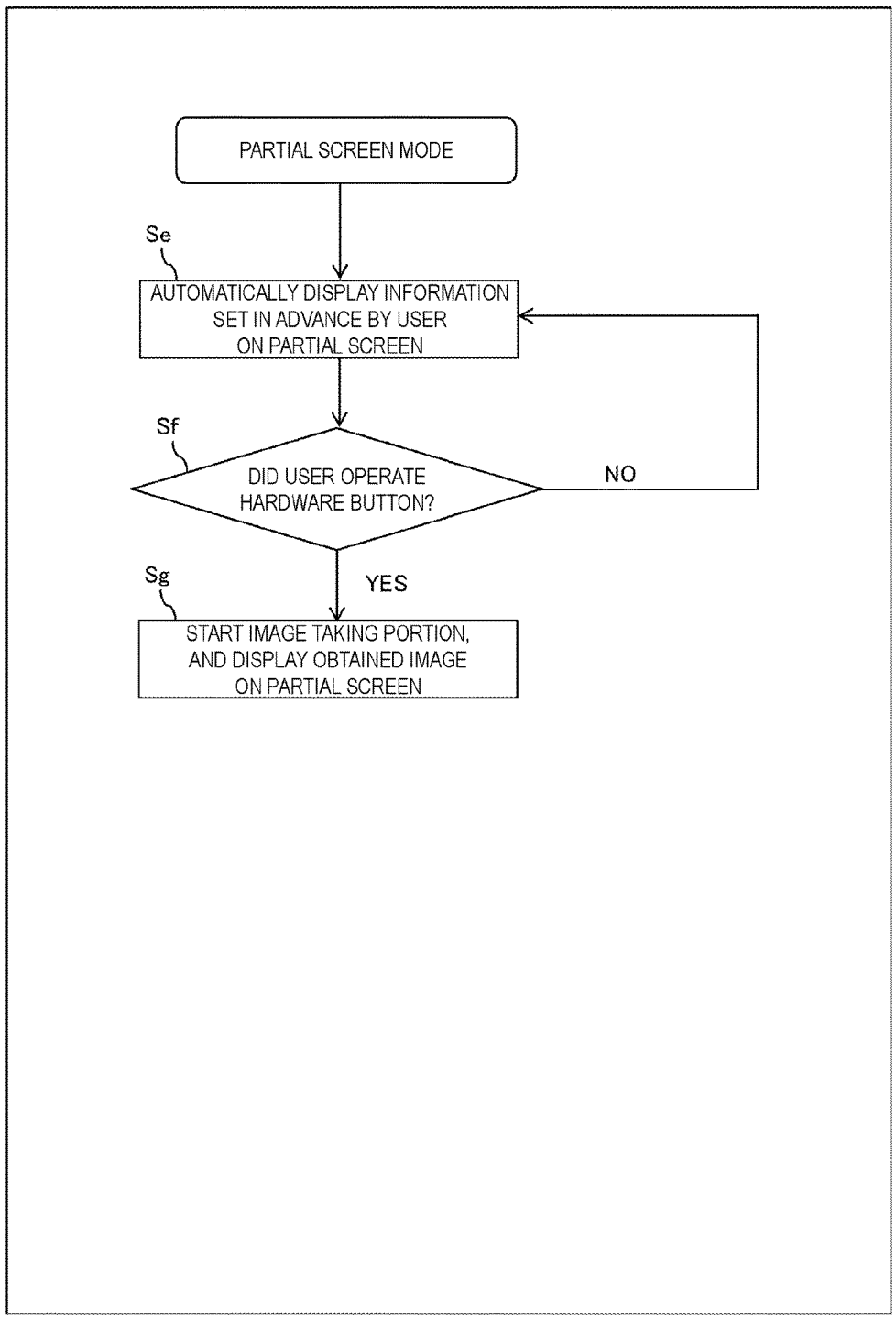
FIG. 14 is a flowchart showing another display procedure in partial screen mode.
Figure 15A:
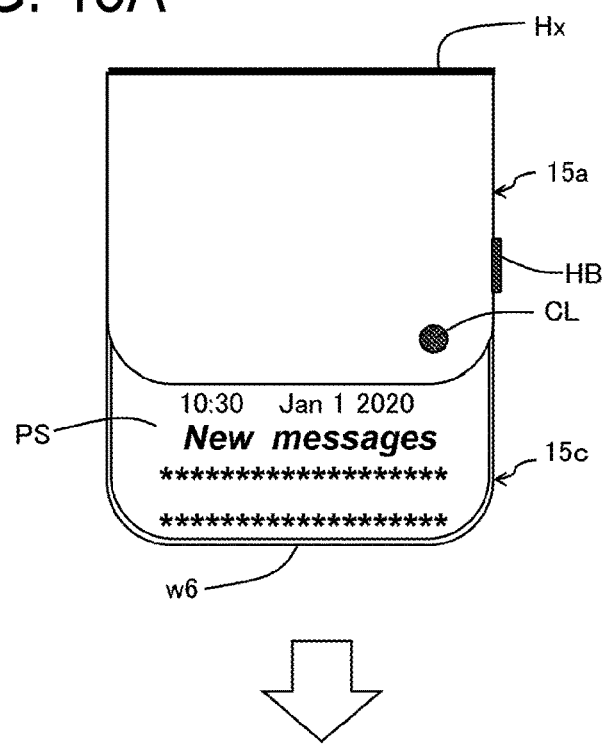
FIGS. 15A and 15B are schematic views illustrating the transition of the display in the case of FIG. 14.
Figure 15B:
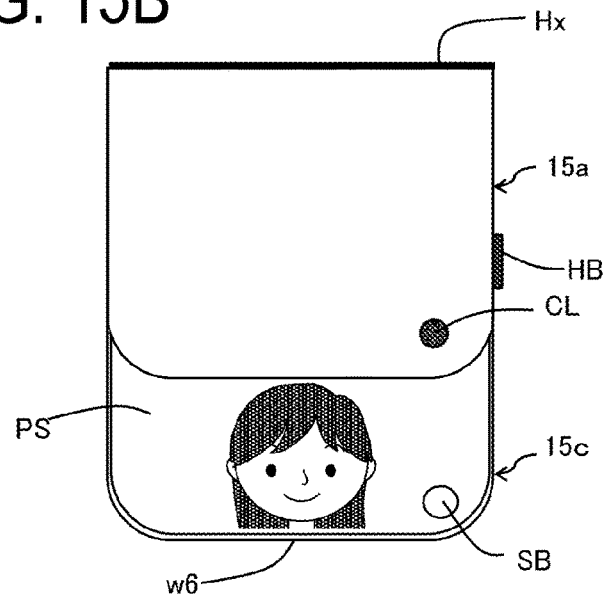
Figure 17:
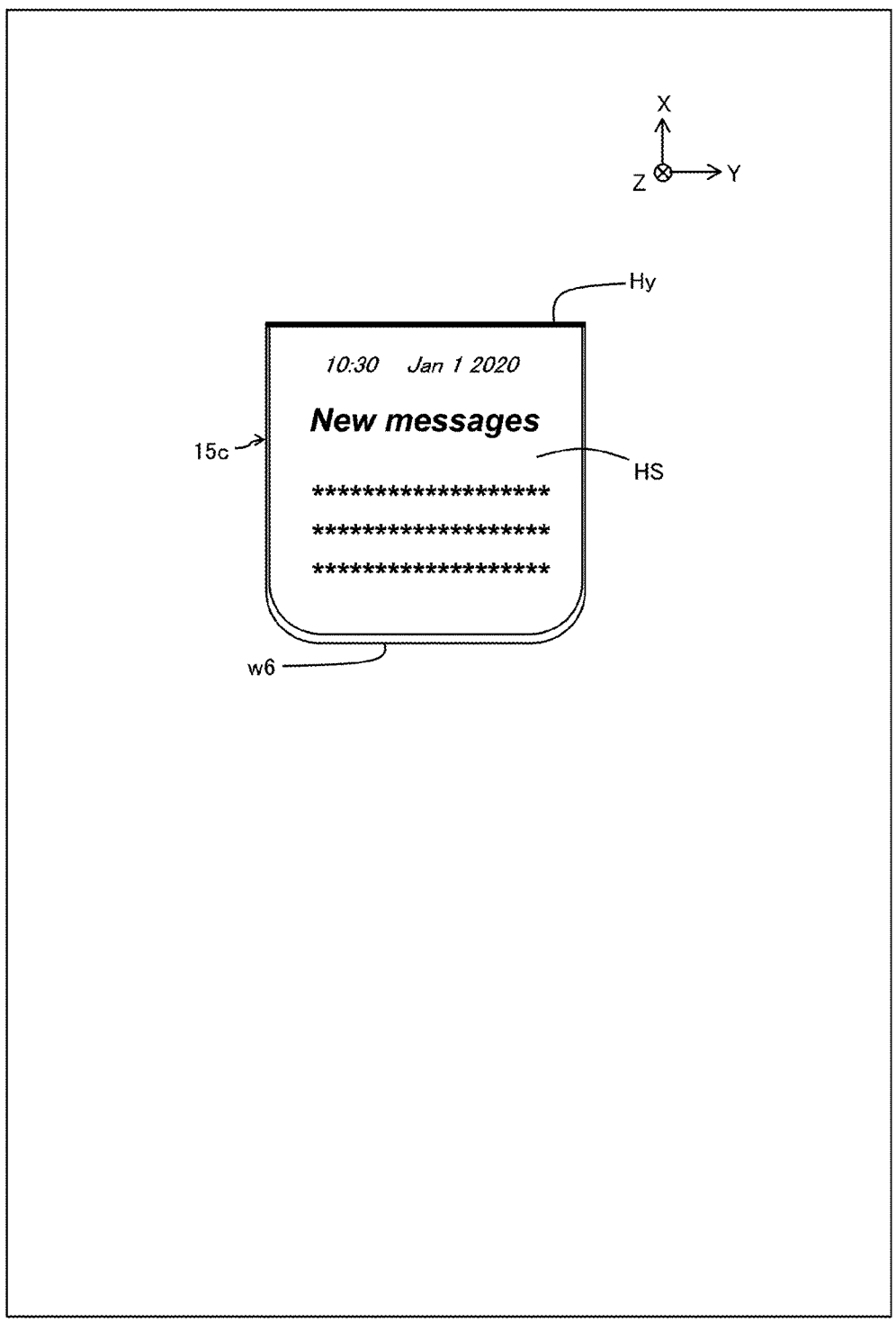
FIG. 17 is a plan view illustrating another mode example of the present embodiment.

FIG. 14 is a flowchart showing another display procedure when the electronic device is in partial screen mode. FIGS. 15A and 15B are schematic views illustrating display examples of the partial screen (from "information display" to "image taking"). In this case, the control portion 26 causes the information set in advance by the user to be automatically displayed on the partial screen PS as in FIG. 15A (step Se). In step Se, the current time may be automatically displayed, or newly arrived information among the plurality of types of information (Messages, News, etc.) set in advance by the user may be displayed.

Next, when the user operates a hardware button HB disposed on a side face of the first housing 15a, the control portion 26 starts the image taking portion 22 and causes the image obtained via the lens CL to be displayed on the partial screen PS as in FIG. 15B (step Sg). In this case, for example, the image is taken when the user operates the software button on the partial screen PS, or the hardware button HB. While FIGS. 15A and 15B are views when the electronic device 10 is in the forward direction, the same holds true in the reverse direction as well. Note that the contents of the displayed information can be automatically changed when the electronic device 10 is in the forward direction (refer to FIG. 6D) and when the electronic device 10 is in the reverse direction (refer to FIG. 7D) in step Se. For example, new messages can be automatically displayed on the partial screen PS when the electronic device 10 is in the forward direction, and new news can be automatically displayed on the partial screen PS when the electronic device 10 is in the reverse direction.

With the partial screen mode (refer to FIGS. 6D and 7D) made available as described above, when checking a portion of the display face (the partial screen PS) is sufficient, that is, when the information required by the user can be displayed on the partial screen PS, the user does not have to open the display face in its entirety, resulting in enhanced convenience for the user.

Furthermore, as illustrated in FIGS. 12A and 12B, the lens CL and the partial screen PS can be oriented toward the user in partial screen mode, making it possible to shoot a selfie using the lens CL on the back face of the electronic device 10, resulting in the advantage that a lens for shooting selfies does not need to be separately provided on the display face side. Furthermore, in this partial screen mode, it is also possible to perform teleconference calls (a system in which a caller makes a telephone call while transmitting an image of himself or herself and receiving an image of the other party).

While in the embodiment described above the lens CL of the image taking portion 22 is close to the housing wall w1 and one side wall of the first housing 15a as illustrated FIG. 2B or other drawings, the present disclosure is not limited thereto. The lens CL may be set close to another side wall of the first housing 15a as in FIG. 16A, or close to the housing wall w6 of the third housing 15c as in FIG. 16B.

Furthermore, while in the embodiment described above the tilt sensor 24k is provided, making it possible to use the housing wall w6 (an edge of the electronic device on the third housing side) as the vertically downward side or as the vertically upward side, the present disclosure is not limited thereto. For example, a display such as in FIG. 6 may be executed regardless of the direction of the electronic device 10 (whether the housing wall w6 serves as the vertically downward side or the vertically upward side).

Furthermore, while the three modes (full screen mode, partial screen mode, and closed mode) are described in the embodiment above, the modes are not limited thereto. In the present embodiment, the second hinge Hy is a flexible hinge and thus, as in FIG. 17, a fourth mode where the display panel is folded in two toward the front and a half region HS (half screen) of the display face D is exposed on both sides of the folded electronic device 10 is also possible.

Supplement

An electronic device according to a first aspect includes a first housing, a second housing, a third housing, a first hinge connecting the first housing and the second housing, a second hinge connecting the second housing and the third housing, and a display panel that is continuous and flexible. The display panel includes a display face and a rear face on an opposite side of the display face, the rear face facing upper faces of the first housing, the second housing, and the third housing. The first housing, the second housing, and the third housing are disposed side-by-side in a first direction, exposing the display face in its entirety, in a case that the first hinge and the second hinge are set to open states. The third housing is larger in size in the first direction than the first housing and the second housing. The display face is partially exposed in a case that the first hinge and the second hinge are set to a closed state and an open state, respectively.

According to a second aspect, the display panel is set to full screen mode, allowing use of the display face in its entirety as a display region, in a case that the first hinge and the second hinge are in open states, and the display panel is set to partial screen mode, allowing use of only a portion of the display face as the display region, in a case that the first hinge is in a closed state and the second hinge is in an open state.

According to a third aspect, the first housing, the second housing, and the third housing have sizes in the first direction such that the sizes satisfy a relationship of the second housing<the first housing<the third housing.

According to a fourth aspect, the display face is stored in its entirety in a case that the first hinge is set to an open state and the second hinge is set to a closed state.

According to a fifth aspect, from a state where the display face is stored in its entirety, a portion of the display face is exposed in a case that the first housing is slid in the first direction.

According to a sixth aspect, in a case that the electronic device is in a horizontal state or a state where an edge closer to the third housing is set as a vertically downward side, the display panel is configured to display an image with the edge as a lower side of the image.

According to a seventh aspect, in a case that the electronic device is in a state where the edge closer to the third housing is set as a vertically upward side, the display panel is configured to display an image with the edge as an upper side of the image.

According to an eighth aspect, the first housing includes a lens configured to perform image taking provided on a back face of the first housing.

According to a ninth aspect, the lens faces a same side as a portion of the display face in the partial screen mode.

According to a tenth aspect, information selected by a user is displayed on a portion of the display face in the partial screen mode.

According to an eleventh aspect, an image obtained via the lens is displayed on a portion of the display face in the partial screen mode.

According to a twelfth aspect, the electronic device further includes a first open/closed sensor configured to detect an open/closed state of the first hinge, and a second open/closed sensor configured to detect an open/closed state of the second hinge.

According to a thirteenth aspect, the electronic device further includes a sensor configured to detect whether the electronic device is in a horizontal state or a state where the edge closer to the third housing is set as the vertically downward side, or a state where the edge closer to the third housing is set as the vertically upward side.

According to a fourteenth aspect, a space is formed in each of the first housing, the second housing, and the third housing, the space being configured to store a bending portion of the display panel.

According to a fifteenth aspect, at least one of the first hinge and the second hinge is a flexible hinge.

According to a sixteenth aspect, the display panel includes an OLED panel.

According to a seventeenth aspect, the electronic device further includes a communication function.

A method for controlling the electronic device further including a processor, according to an eighteenth aspect includes determining open/closed states of the first hinge and the second hinge, and setting the display face in its entirety as a display region in a case that the first hinge and the second hinge are in open states, and setting only a portion of the display face as the display region in a case that the first hinge is in a closed state and the second hinge is in an open state.

According to a nineteenth aspect, the method further includes detecting whether the electronic device is in a horizontal state or a state where an edge closer to the third housing is set as a vertically downward side, or a state where the edge closer to the third housing is set as a vertically upward side.

According to a twentieth aspect, the method further includes displaying an image with an edge closer to the third housing as a lower side of the image in a case that the electronic device is in a horizontal state or a state where the edge is set as a vertically downward side, and displaying an image with the edge closer to the third housing as an upper side of the image in a case that the electronic device is in a state where the edge is set as a vertically upward side.

A program according to a twenty-first aspect executes each of the steps on the processor.

The disclosure is not limited to each of the embodiments stated above, and embodiments obtained by appropriately combining technical approaches stated in each of the different embodiments also fall within the scope of the technology of the disclosure. Moreover, novel technical features may be formed by combining the technical approaches stated in each of the embodiments.

REFERENCE SIGNS LIST

10 Electronic device
11 Display
15$a$ to 15$c$ First housing to third housing
CL lens
PS Partial screen
Hx First hinge
Hy Second hinge
w1 to w6 Housing wall
m1 to m6 Magnet

The invention claimed is:

1. An electronic device comprising:
   a first housing;
   a second housing;
   a third housing;
   a first hinge connecting the first housing and the second housing;
   a second hinge connecting the second housing and the third housing; and
   a display panel that is continuous and flexible,
   wherein the display panel includes a display face and a rear face on an opposite side of the display face, the rear face facing upper faces of the first housing, the second housing, and the third housing,
   the first housing, the second housing, and the third housing are disposed side-by-side in a first direction, exposing the display face in its entirety, in a case that the first hinge and the second hinge are set to open states,
   the third housing is larger in size in the first direction than the first housing and the second housing,
   the display face is partially exposed in a case that the first hinge and the second hinge are set to a closed state and an open state, respectively, and
   the first housing, the second housing, and the third housing have sizes in the first direction such that the sizes satisfy a relationship of the second housing<the first housing<the third housing.

2. The electronic device according to claim 1, further comprising:
   a first open/closed sensor configured to detect an open/closed state of the first hinge; and
   a second open/closed sensor configured to detect an open/closed state of the second hinge.

3. The electronic device according to claim 1,
   wherein at least one of the first hinge and the second hinge is a flexible hinge.

4. The electronic device according to claim 1,
   wherein the display panel includes an OLED panel.

5. The electronic device according to claim 1, further comprising:
   a communication function.

6. The electronic device according to claim 1,
   wherein the display panel is set to full screen mode, allowing use of the display face in its entirety as a display region, in a case that the first hinge and the second hinge are in open states, and
   the display panel is set to partial screen mode, allowing use of only a portion of the display face as the display region, in a case that the first hinge is in a closed state and the second hinge is in an open state.

7. The electronic device according to claim 6, wherein, in a case that the electronic device is in a horizontal state or a state where an edge closer to the third housing is set as a vertically downward side, the display panel is configured to display an image with the edge as a lower side of the image.

8. The electronic device according to claim 7, wherein, in a case that the electronic device is in a state where the edge closer to the third housing is set as a vertically upward side, the display panel is configured to display an image with the edge as an upper side of the image.

9. The electronic device according to claim 8, wherein the electronic device further includes a sensor configured to detect whether the electronic device is in a horizontal state or a state where the edge closer to the third housing is set as the vertically downward side, or a state where the edge closer to the third housing is set as the vertically upward side.

10. The electronic device according to claim 6, wherein the first housing includes a lens configured to perform image taking provided on a back face of the first housing.

11. The electronic device according to claim 10, wherein the lens faces a same side as a portion of the display face in the partial screen mode.

12. The electronic device according to claim 11, wherein an image obtained via the lens is displayed on a portion of the display face in the partial screen mode.

13. The electronic device according to claim 6, wherein information selected by a user is displayed on a portion of the display face in the partial screen mode.

14. The electronic device according to claim 1, wherein the display face is stored in its entirety in a case that the first hinge is set to an open state and the second hinge is set to a closed state.

15. An electronic device comprising:
a first housing;
a second housing;
a third housing;
a first hinge connecting the first housing and the second housing;
a second hinge connecting the second housing and the third housing; and
a display panel that is continuous and flexible,
wherein the display panel includes a display face and a rear face on an opposite side of the display face, the rear face facing upper faces of the first housing, the second housing, and the third housing,
the first housing, the second housing, and the third housing are disposed side-by-side in a first direction, exposing the display face in its entirety, in a case that the first hinge and the second hinge are set to open states,
the third housing is larger in size in the first direction than the first housing and the second housing,
the display face is partially exposed in a case that the first hinge and the second hinge are set to a closed state and an open state, respectively, and
the display face is stored in its entirety in a case that the first hinge is set to an open state and the second hinge is set to a closed state.

16. The electronic device according to claim 15, wherein, from a state where the display face is stored in its entirety, a portion of the display face is exposed in a case that the first housing is slid in the first direction.

17. The electronic device according to claim 15, wherein a space is formed in each of the first housing, the second housing, and the third housing, the space being configured to store a bending portion of the display panel.

18. An electronic device comprising:
a first housing;
a second housing;
a third housing;
a first hinge connecting the first housing and the second housing;
a second hinge connecting the second housing and the third housing; and
a display panel that is continuous and flexible,
wherein the display panel includes a display face and a rear face on an opposite side of the display face, the rear face facing upper faces of the first housing, the second housing, and the third housing,
the first housing, the second housing, and the third housing are disposed side-by-side in a first direction, exposing the display face in its entirety, in a case that the first hinge and the second hinge are set to open states,
the third housing is larger in size in the first direction than the first housing and the second housing,
the display face is partially exposed in a case that the first hinge and the second hinge are set to a closed state and an open state, respectively, and
a space is formed in each of the first housing, the second housing, and the third housing, the space being configured to store a bending portion of the display panel.

19. The electronic device according to claim 18, wherein the display panel is set to full screen mode, allowing use of the display face in its entirety as a display region, in a case that the first hinge and the second hinge are in open states, and the display panel is set to partial screen mode, allowing use of only a portion of the display face as the display region, in a case that the first hinge is in a closed state and the second hinge is in an open state.

20. The electronic device according to claim 19, wherein, in a case that the electronic device is in a horizontal state or a state where an edge closer to the third housing set as a vertically downward side, the display panel is configured to display an image with the edge as a lower side of the image.

* * * * *